No. 659,810. Patented Oct. 16, 1900.
E. CHERRY.
MECHANICAL MOVEMENT.
(Application filed Dec. 30, 1899.)
(No Model.)
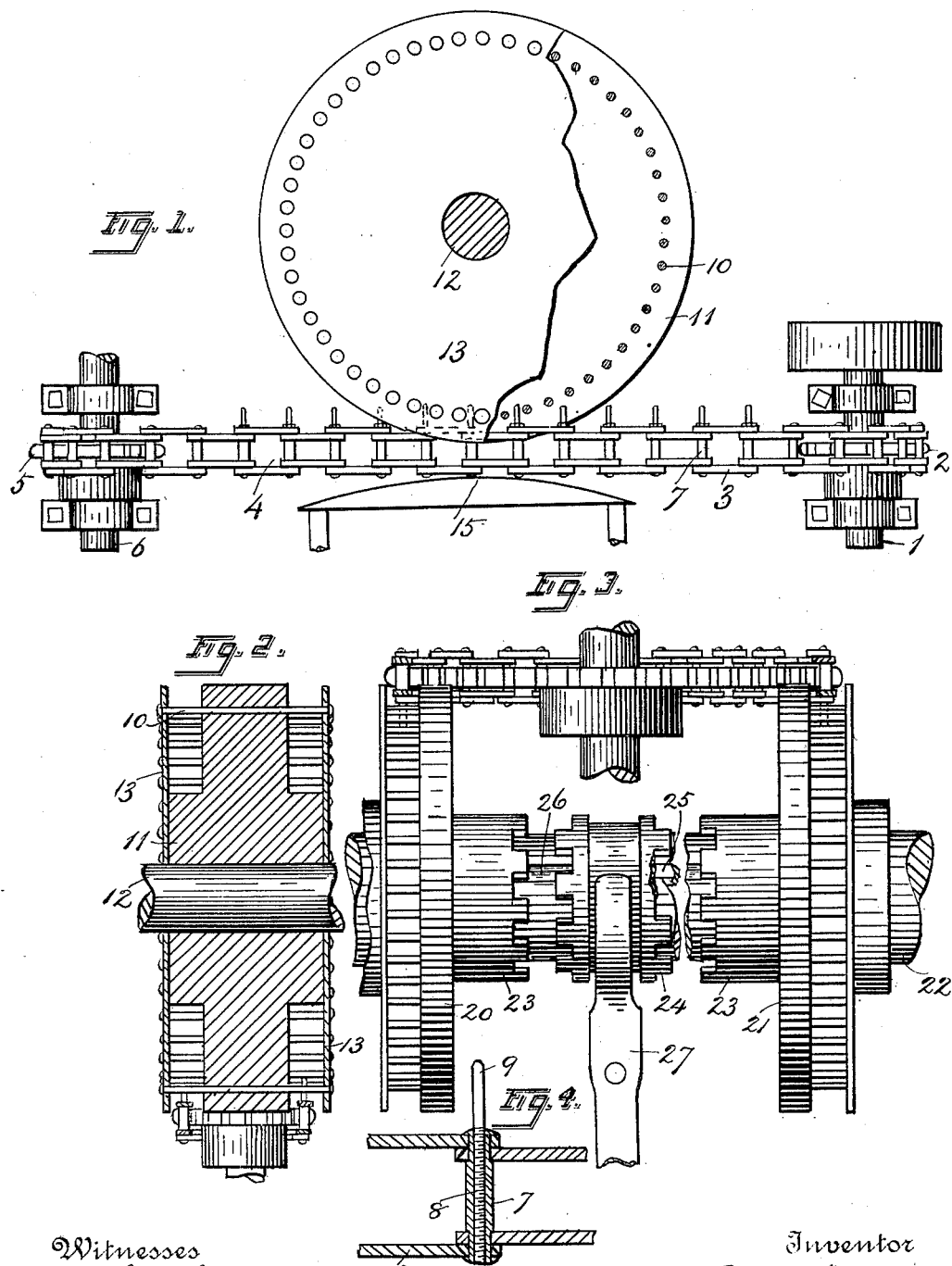

UNITED STATES PATENT OFFICE.

EDGAR CHERRY, OF SANTA ROSA, CALIFORNIA.

MECHANICAL MOVEMENT.

SPECIFICATION forming part of Letters Patent No. 659,810, dated October 16, 1900.

Application filed December 30, 1899. Serial No. 742,106. (No model.)

*To all whom it may concern:*

Be it known that I, EDGAR CHERRY, a citizen of the United States, residing at Santa Rosa, in the county of Sonoma and State of California, have invented certain new and useful Improvements in Mechanical Movements, of which the following is a specification.

My invention relates to improvements in mechanical movements, the objects of my invention being to provide mechanism whereby a reciprocating or intermittent rotary motion may be derived from a continuous rotary motion, also to provide means whereby the intervals of rest and movement in the derived motion may be varied at pleasure, and also to provide means for reversing at pleasure the direction of an intermittent motion of a shaft driven from a shaft revolving continuously in the same direction.

My invention is particularly applicable for reversing the propelling mechanism in boats driven by gasolene-engines, for hoisting-engines, for iron-planing machines, for automobiles, and for many other purposes not now specified.

In the accompanying drawings, Figure 1 is a side elevation of my improved device. Fig. 2 is a vertical section thereof. Fig. 3 is a front view showing a modified form of the invention for reversing the motion of rotation, and Fig. 4 is a vertical section of one of the joints of the sprocket-chain enlarged.

Upon the vertical driving-shaft 1 is mounted the sprocket-wheel 2, the teeth of which engage the links 3 of the sprocket-chain 4, said chain traveling horizontally to a second sprocket-wheel 5 on an idle shaft 6. The rivets 7 of said chain are hollow and are screw-threaded on their inner surface, as shown at 8, to receive pins 9, screwed thereinto, the ends of said pins projecting upwardly from said rivets, and thus being adapted to enter between pins 10, extending in a circle from one face of a wheel 11 on the driven shaft 12. Similar pins 10 also extend from the other face of the wheel. Strengthening-plates 13 are arranged parallel with the wheel, in which plates the outer ends of the pins 10 are supported. It is evident that if pins 9 be screwed in certain of the hollow rivets 7, the other rivets being left empty, an intermittent reciprocating rotary motion will be imparted to the shaft 12 from the continuous motion of the driving-shaft 1, and this derived motion may be varied as to the periods of rest and movement by inserting or withdrawing a sufficient number of the pins 9 from the hollow rivets. In order to insure engagement of the pins 10 with the pins 9, a guiding-surface 15 is provided, over which the chain travels.

In the modification of the invention shown in Fig. 3 an arrangement is shown whereby the direction of intermittent rotation of a driven shaft may be reversed at pleasure without reversing the direction of rotation of the continuously-moving driving-shaft. In this construction wheels 20 and 21 are mounted loosely on a shaft 22, each wheel having a hub 23, and between said hubs is a sliding clutch 24, having a feather 25 sliding in a groove 26 in said shaft. A forked lever 27 is used for throwing the clutch into engagement with one or the other of the hubs 23. The wheels 20 and 21 are rotated in opposite directions by a sprocket-chain 4 in the manner above described, and thus the direction of rotation of the shaft 22 may be reversed by moving the clutch as desired.

I claim—

1. In a mechanical movement, the combination of a pin-wheel, a sprocket-wheel and a sprocket-chain traveling around the latter and tangentially to the former wheel, the chain having hollow rivets and pins removably secured in said rivets, which pins engage the pins of the pin-wheel, substantially as described.

2. In a mechanical movement, the combination of a shaft, two circular series of pins carried on said shaft as an axis, a sprocket-wheel and a sprocket-chain traveling around the latter and passing tangentially to each series of pins in opposite directions, said chain having pins removably mounted in the axes of certain of its links and projecting therefrom, which pins engage alternately the pins on the two series, substantially as described.

3. In a mechanical movement, the combination of a shaft, two circular series of pins carried on said shaft as an axis, a sprocket-wheel and a sprocket-chain traveling around the latter and passing tangentially to each series in opposite directions, said chain having pins removably mounted in the axes of certain of its links and projecting therefrom, which pins engage alternately the pins on the two series, and a clutch for throwing one or the other of the series into revoluble engagement with the shaft, substantially as described.

In witness whereof I have hereunto set my hand in the presence of two subscribing witnesses.

EDGAR CHERRY.

Witnesses:
FRANCES M. WRIGHT,
Z. A. DANIELS.